United States Patent [19]
Chan et al.

[11] Patent Number: 5,568,029
[45] Date of Patent: Oct. 22, 1996

[54] JOINT CONTROL SYSTEM WITH LINEAR ACTUATION

[75] Inventors: Danley C. K. Chan; Peter D. Lawrence, both of Vancouver, Canada

[73] Assignee: The University of British Columbia, Vancouver, B.C., Canada

[21] Appl. No.: 372,752

[22] Filed: Jan. 13, 1995

[51] Int. Cl.[6] ............................................. B25J 9/18
[52] U.S. Cl. ................... 318/568.11; 318/560; 318/644; 318/652; 318/671; 318/687; 310/12
[58] Field of Search ........................ 310/11, 12; 212/71, 212/131, 138, 139, 266, 267, 268; 318/568.11, 560, 644, 652, 671, 687; 388/929; 37/411, 414; 60/427; 901/20; 414/4

[56] References Cited

U.S. PATENT DOCUMENTS

| | | | |
|---|---|---|---|
| 4,283,886 | 8/1991 | Obear | 37/411 X |
| 5,247,743 | 9/1993 | Holloway et al. | 37/411 X |

Primary Examiner—William M. Shoop, Jr.
Assistant Examiner—Karen Masih
Attorney, Agent, or Firm—Rowley, C. A.

[57] ABSTRACT

A system for controlling the operation of a tele-operated machine uses a sensor which senses the angular orientation of the joint, converts the angular orientation to a required length of the linear actuator (piston and cylinder) to obtain the then current length. A controller inputs the desired position of the joint and the system defines the length of (or flow to) the linear actuator necessary for the joint to be in the desired position based on a comparison of the desired and actual lengths of the actuator and sets the length of (or flow to) the actuator based on the required length (or flow) necessary to move the joint into the desired position i.e. to extend the length of the actuator to that required for the desired movement of the joint. Alternatively the actual and desired positions may be compared in a comparer (subtracter or adder) and the resultant signal modified based on a function of the actual position and the equipment being controlled and the modified signal is used to define the required length of or flow to the actuator.

12 Claims, 3 Drawing Sheets

JOINT CONTROL SYSTEM WITH LINEAR ACTUATION

FIELD OF THE INVENTION

The present invention relates to a joint control system, more particularly the present invention relates to a linear actuator control system for accurately positioning a joint.

BACKGROUND TO THE PRESENT INVENTION

Control systems for adjusting the angular relationships between joints in a computer controlled machine, for example, an excavator having a boom, stick and bucket mounted from a base or cab platform, control the various articulated joints to properly move and position the bucket for digging or moving materials. Each joint, obviously must be individually controlled and coordinated with the other joints to obtain the desired result of position, orientation and movement of the bucket.

A number of different techniques have been used to control the operation of such excavator using tele-operation systems, eg. controlled by a joy stick. Examples of such control systems in U.S. Pat. No. 5,062,2264 issued Nov. 5, 1991 to Frenette et al and U.S. Pat. No. 5,062,755 issued Nov. 5, 1991 to Lawrence et al.

One technique to control an individual joint is to measure the joint angle and to feed this joint angle information to the system, and then the control drives the arm (joints) to a desired angle defined by manipulation of the control element, such as a computer or a joy stick. The system compares the desired angle (set by the computer or joy stick) with the actual angular position (measured) and defines the required change in angle. This change in angle is used to control the valve in a hydraulic system which controls the flow of hydraulic fluid in the cylinder to cause the desired repositioning of the arm (bucket).

These systems, since they are dealing with angles, and generally controlling the action of linear actuators, i.e. degree of extension of each actuator must be defined for the change in angle at the joint. Depending the angle of the joint, the amount of extension of the hydraulic actuator to obtain a given change in angle at the joint may vary from minuscule to very large which imparts very significant non-linearities to the control system.

An alternative system senses and set the desired length of the hydraulic actuator and then use a similar technique to that described above to control the length of the actuator. The actual length and desired length are compared and each actuator controlled accordingly. These systems have not reached the same degree of success as the control based on angle sensing because of the difficulty in measurement of degree of extension and the relatively high cost associated with such a system and a need to replace the sensing system when the cylinder is changed.

In hydraulic machines with buckets to handle material a problem may occur when manipulating the arm wherein changes in the angles of the arm (for example the boom and stick) result in repositioning of the bucket from a position wherein the material contained in the bucket is held therein to a position wherein the material spills from the bucket.

One form of closed loop control is shown in Japanese patent publication 59-195937 (A) published 7 Nov. 1984 to Honma. In this patent the control is based on the difference between the desired angle and the sensed angle and added gain applied to the difference, further supplemented by the desired angular velocity and then subjected to a non-linear function to provide an output signal to control the equipment—in this case for linear movement of the bucket of an excavator. The presence of a non-linearity in a control loop complicates the tuning (initial and/or ongoing) of the control gain applied.

Canadian patent 1,072,324 issued Feb. 2, 1980 to Haak et al. discloses another hydraulic control for controlling the attitude of a bucket on an excavator or the like. This system is based on control of flow between different hydraulic cylinders on the machine.

BRIEF DESCRIPTION OF THE PRESENT INVENTION

It is object of the present invention to provide a control system for a joint (for example of an articulated arm) by measuring joint angle and determining the degree of extension of the linear actuator (hydraulic cylinder) required for that joint angle and subtracting that from the required extension of the linear actuator derived from the desired joint angle.

Broadly the present invention relates to a closed loop control system for controlling the operation of a linear actuator means to manipulate an articulated joint of a computer controlled machine, comprising means to input a desired change ($\delta\theta_{des}$) in angular position of said joint, means for converting said desired change in angular position ($\delta\theta_{des}$) for said joint to a desired length ($L_{des}$) of said linear actuator means, means for sensing angular position $\theta_{act}$ of said joint, means for converting said sensed angular position ($\theta_{act}$) into an actual length ($L_{act}$) of said linear actuator means, means for determining the required change in length ($\delta L_{req}$) from the desired length ($L_{des}$) by subtracting said actual length ($L_{act}$) from said desired length ($L_{des}$) to define said required change in length ($\delta L_{req}$) of said linear actuator.

Broadly the present invention also relates to a closed loop control system for controlling the operation of a linear actuator means to manipulate an articulated joint of a tele-operated machine, comprising inputting means to input a desired change in angular position ($\delta\theta_{des}$) of said joint, means to determine the then current desired angular position ($\theta_{des}$) of said joint, means for measuring the angular position ($\theta_{act}$) of said joint at that time, means for subtracting said measured angular position ($\theta_{act}$) from said desired angular position ($\theta_{des}$) to define a required change in angular position ($\delta\theta_{req}$) and non-linear converting means for converting said required change in angular position ($\delta\theta_{req}$) to a required change in length ($\delta L_{req}$) of said linear actuator means for changing said joint angle as required, said non-linear converting means converting said required angle ($\theta_{req}$) to said required length ($L_{req}$) based on said sensed angular position ($\theta_{act}$).

Preferably said joint will for at least one joint connecting a pair of arm segments of an articulated arm form by a plurality of said arm segments.

Preferably said linear actuator means will comprise a piston and cylinder.

Said system may further comprise means to convert said desired length ($L_{des}$) into a signal representative of a desired flow ($q_{des}$) of hydraulic fluid to position said joint in a desired portion and to convert said actual length ($L_{act}$) to a signal representative of an actual flow ($q_{act}$) of hydraulic fluid for that position of said joint and wherein said subtracter subtracts said actual flow ($q_{act}$) from said desired

3 flow ($q_{des}$) to define a required flow ($q_{req}$) to reposition said joint.

Preferably said at least one joint will comprise joint connecting a bucket to a free end of said arm said closed loop control system controls the attitude of said bucket to the world $\theta_{world}$.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
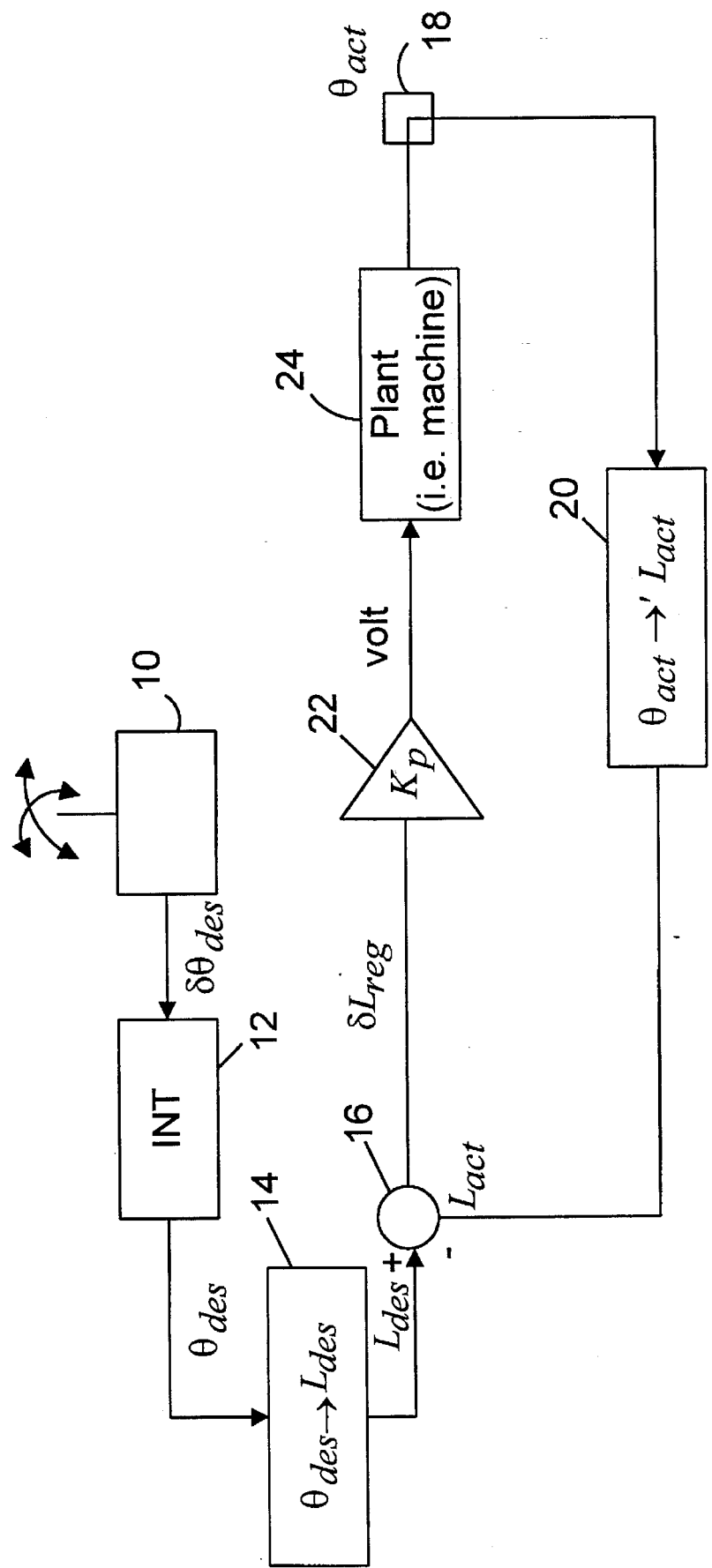
FIG. 1 is a simplified schematic flow diagram illustrating a system operating in accordance with the present invention.

The present invention as illustrated in FIG. 1 includes the joy stick or the like manual controller schematically designated by the 10 (the controller may alternatively be an appropriately programmed computer) which defines the change in position $\delta\theta_{des}$ over a period of time $\delta t$ of the articulated arm being controlled. This information is integrated as indicated at 12 to provide a signal indicative of the desired position of the joint(s) $\theta_{des}$ and this signal is converted as indicated at 14 to a signal representative of the desired in length $L_{des}$ of the linear actuator being controlled which is fed to a subtracter (or adder) 16.

The angular position of the joint being controlled $\theta_{act}$ is measured as indicated at 18 as indicated at 20 is converted to the actual length $L_{act}$ of the linear actuator being controlled and this information is fed to the subtracter (or adder) 16 which provides an output signal indicative of the requires change in length $\delta L_{req}$ which is converted to the required signal strength (voltage) in the gain control 22 and this output from gain control 22 is used to control the movement of the linear actuator being controlled as indicated at 24 e.g. by means of a hydraulic valve when a hydraulic cylinder is being controlled.

The conversions from $\theta_{des}$ or $\theta_{act}$ to $L_{des}$ or $L_{act}$ respectively may be attained by any of at least three well known methods including the use of closed form equations as derived by Duffy for example as described in J. Duffy, Analysis of Mechanisms and Robotic Manipulators, E. Arnold Publishers, London, 1980; the use of numerical approximations to the Duffy equations using trigonometric lookup tables and/or series approximations, to trigonometric functions; or the use of a scale mechanical model of the linkage, measuring L and $\theta$ in various positions of the linkage and providing a lookup table of L verses $\theta$.

Figure 2:
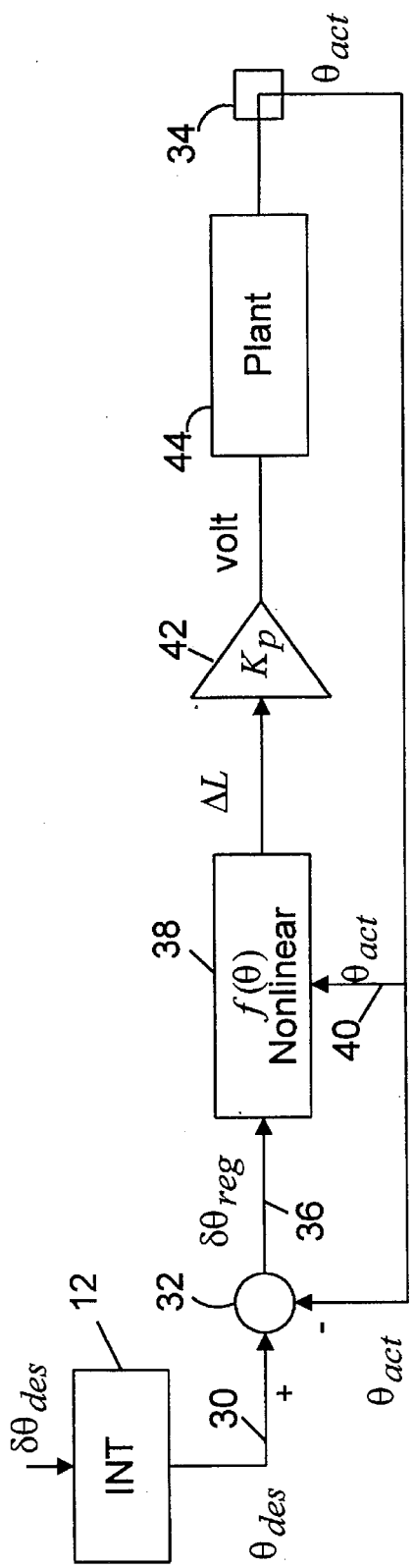
FIG. 2 is a schematic drawing illustrating another form of the present invention.

The FIG. 2 embodiment is based on the similar principle to FIG. 1 but is not as effective a control system as the FIG. 1 embodiment. In the FIG. 2 embodiment instead of converting each of the desired and actual position angles to the desired and actual lengths of the linear actuator being controlled the desired angular position as defined by the computer controller or the like 10 (not shown in FIG. 2) is as indicated by the line 30 fed to subtracter (or adder) 32. The actual angle or position is measured as indicated at 34 to determine the actual position or angle of the joint being controlled $\theta_{act}$ and this information is fed to the subtracter 32 which provides an output indicating the required change in angle or position $\delta\theta_{req}$ as indicated in line 36.

The signal $\delta\theta_{req}$ is then converted in a non-linear converter as indicated at 38 to provide the required change in length $\delta L_{req}$ of the linear actuator controlling the joint being controlled. The non-linear converter 38 is provided with the actual position of the joint as indicated by line 40.

Figure 2A:
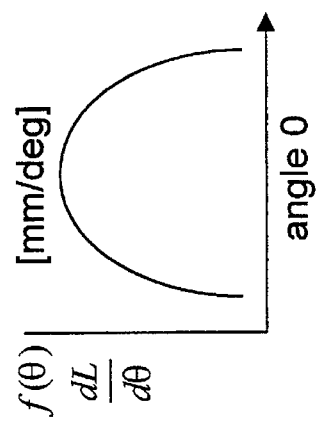
FIG. 2A shows schematically a function based on actual portion that may be used in the control system of FIG. 2.

The non-linear function is schematically illustrated in FIG. 2A and is a function of $\theta_{act}$ ($f(\theta_{act})$) based on the required change in length $\delta L$ for a given change in angle or position $\delta\theta$ at the then current angle or position $\theta_{act}$. The non-linear function is based on or derived from the equipment being controlled and normally will be the derivative of the curve of $L_{act}$ verses $\theta_{act}$ for the particular equipment being controlled.

The output from the non-linear converter 38 output i.e. the required change in length $\delta L_{req}$ the linear actuator being controlled is the subject to the desired gain control as indicated at 42 and this output used to control the plant i.e. the linear actuator being controlled as indicated at 44.

Figure 3:
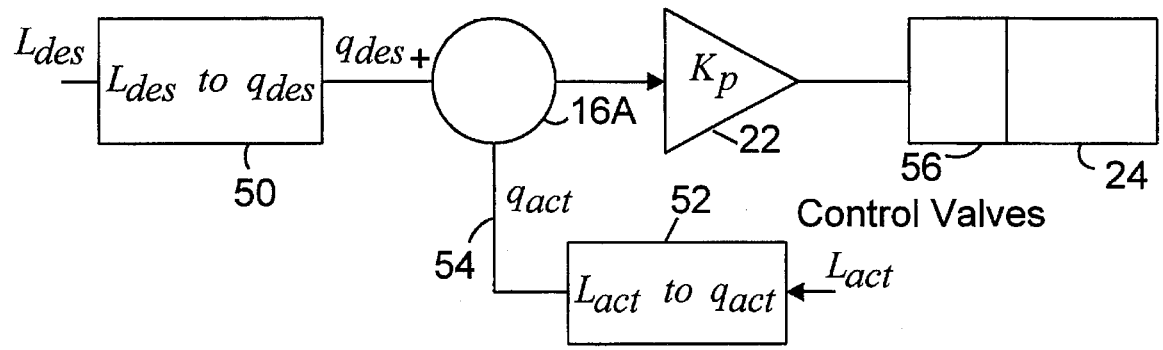
FIG. 3 illustrates a modified version of the control system illustrated in FIG. 1.

If desired the system of FIG. 1 could be further modified to convert the lengths of the actuator i.e. $L_{des}$ and $L_{act}$ to the corresponding hydraulic flows $q_{des}$ and $q_{act}$ required as shown schematically in FIG. 3. $L_{des}$ is converted into the desired flow $q_{des}$ as indicated at 50 to obtain the desired flow of hydraulic fluid for the arm to be in the position set by the computer control, e.g. joy stick. This flow is determined as follows;

$$q_{des}=(L_{des}-L_{old-(des)})A/\delta t$$

where $L_{des}$ is the new desired length of the actuator $L_{old-(des)}$ is the previous desired length A is the effective area of the piston $\delta t$ is the time increment which the desired change is to take place.

The $q_{des}$ value is fed to a subtracter (or adder) 16A, i.e. the output from the converter 50 which determines the $q_{des}$ is fed to the subtracter 16A.

At the same time, the actual length or degree of extension of the linear actuator (piston and cylinder) $L_{act}$ is converted to the quantity of fluid flow for the actual position $q_{act}$ as follows $$q_{act}=L_{act}-L_{old-(act)})a/\delta t$$

where $L_{old-(act)}$ is the previous length of the actuator, and the others are as above defined.

as indicated at 52. This information is fed as indicated by the line 54 to the subtracter 16A which then determines the required change in flow $\delta q$ which then provides a value which is converted to a signal to set the pilot valves as indicated at 56 in FIG. 3.

Figure 4:
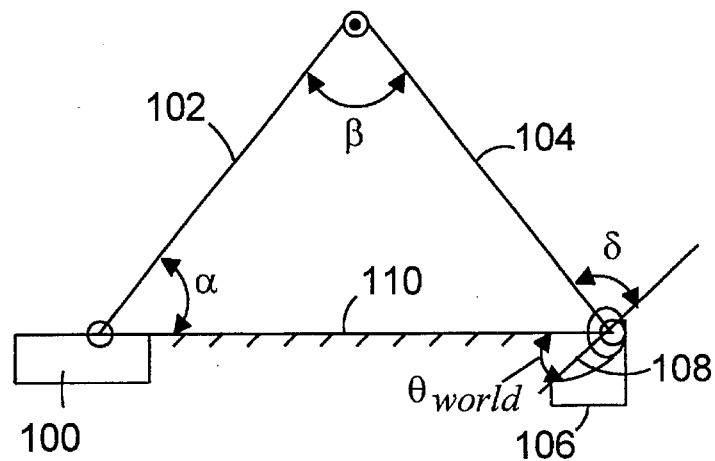
FIG. 4 is a schematic-illustration of one application of the present invention used to prevent unintentional dumping of the bucket during the manipulation of the arm.

Referring to FIG. 4 a specific application of the present invention is schematically illustrated. In this system an excavator or the like having a base 100 include an articulated arm formed by a boom 102 moveable relative to the base as indicated by the angle represented by the arc $\alpha$. Mounted at the free end of the boom 102 is a stick 104 and mounted on the free end of the stick 104 is a bucket 106. The stick 104 is moveable relative to the boom 102 as indicated schematically by the angle represented by the arc β and the bucket is moveable relative to the stick 104 as indicated by the angle γ (angle γ is the angle between a selected plane 108 on the bucket 106 and the longitudinal axis of the stick 104). The angles α, β and γ are required to position the bucket in space and to define the angle of the plane 108 on the bucket 106 to the horizontal 110 which in effect provides the angle of the bucket relative to the world as represented by the arc $\theta_{world}$ i.e. angles α, β and γ define the y and z coordinates of the free end of the stick and $\theta_{world}$ defines the attitude of the bucket to the horizontal (the world).

In the preferred application of the present invention the closed loop control of the present invention is applied to control the angle $\theta_{world}$ to hold the bucket in a position where it does not become oriented to tip and spill its contents except at the command of the operator.

Having described the invention modifications will be evident to those skilled in the art without departing from the spirit of the invention as defined in the appended claims.

We claim:

1. A closed loop control system for controlling the operation of a linear actuator means to manipulate an articulated joint of a tele-operated machine, comprising means to input a desired change ($\delta\theta_{des}$) in angular position of said joint, means for converting said desired change in angular position ($\delta\theta_{des}$) for said joint to a desired length ($L_{des}$) of said linear actuator means, means for sensing angular position $\theta_{act}$ of said joint, means for converting said sensed angular position ($\theta_{act}$) into an actual length ($L_{act}$) of said linear actuator means, means for determining a required change in length ($\delta L_{req}$) from the desired length ($L_{des}$) by subtracting said actual length ($L_{act}$) from said desired length ($L_{des}$) to define said required change in length ($\delta L_{req}$) of said linear actuator.

2. A closed loop control system as defined in claim 1 wherein said joint forms at least one joint connecting a pair of arm segments of an articulated arm formed by a plurality of said arm segments.

3. A closed loop control system as defined in claim 1 wherein said linear actuator means comprise a piston and cylinder.

4. A closed loop control system as defined in claim 2 wherein said linear actuator means comprise a piston and cylinder.

5. A closed loop control system as defined in claim 1 further comprising means to convert said desired length ($L_{des}$) into a value representative of a desired flow ($q_{des}$) of hydraulic fluid to position said joint in a desired position and to convert said actual length ($L_{act}$) to a value representative of an actual flow ($q_{act}$) of hydraulic fluid for that position of said joint and wherein said subtracter subtracts said value representative of said actual flow ($q_{act}$) from said value representative of said desired flow ($q_{des}$) to define a required flow ($q_{req}$) to reposition said joint.

6. A closed loop control system as defined in claim 1 further comprising means to convert said desired length ($L_{des}$) into a value representative of a desired flow ($q_{des}$) hydraulic fluid to position said joint in a desired position and to convert said actual length ($L_{act}$) to a value representative of an actual flow ($q_{act}$) of hydraulic fluid for that position of said joint and wherein said subtracter subtracts said value representative of said actual flow ($q_{act}$) from said value representative of said desired flow ($q_{des}$) to define a required flow ($q_{act}$) to reposition said joint.

7. A closed loop control system as defined in claim 2 wherein said joint comprises a joint between said arm and a bucket at a free end of said arm and said closed loop control system controls the attitude of said bucket to the world $\theta_{world}$.

8. A closed loop control system as defined in claim 4 wherein said joint comprises a joint between said arm and a bucket at a free end of said arm and said closed loop control system controls the attitude of said bucket to the world $\theta_{world}$.

9. A closed loop control system as defined in claim 6 wherein said joint comprises a joint between said arm and a bucket at a free end of said arm and said closed loop control system controls the attitude of said bucket to the world $\theta_{world}$.

10. A closed loop control system for controlling the operation of a linear actuator means to manipulate an articulated joint of a tele-operated machine, comprising inputting means to input a desired change in angular position ($\delta\theta_{des}$) of said joint, means for determine a then current desired angular position ($\theta_{des}$) of said joint, means for sensing the angular position ($\theta_{act}$) of said joint at that time, means for subtracting said measured angular position ($\theta_{act}$) from said desired angular position ($\theta_{des}$) to define a required change in angular position ($\delta\theta_{req}$) and non-linear converting means for converting said required change in angular position ($\delta\theta_{req}$) to a required change in length ($\delta L_{req}$) of said linear actuator means for changing said angular position of said joint to a required angle ($\theta_{req}$), and said non-linear converting means converting said required angle ($\theta_{req}$) to a required length ($L_{req}$) based on said sensed angular position ($\theta_{act}$).

11. A closed loop control system as defined in claim 10 wherein said joint forms at least one joint connecting a pair of arm segments of an articulated arm formed by a plurality of said arm segments.

12. A closed loop control system as defined in claim 10 wherein said linear actuator means comprise a piston and cylinder.

* * * * *